United States Patent
Chiu et al.

(10) Patent No.: US 7,535,807 B2
(45) Date of Patent: May 19, 2009

(54) METHOD FOR IMPLEMENTING OPTIMAL RECORDING POWER FOR MULTI-SESSION RECORDABLE OPTICAL MEDIA IN AN OPTICAL DISC DRIVE

(75) Inventors: Pei-Yu Chiu, Tai-Chung (TW); Yu-Cheng Sung, Taipei (TW); Tso-Tsai Chen, Taipei (TW); William Wai Wang, Tao-Yuan (TW); Chih-Chung Pai, Tai-Chung Hsien (TW)

(73) Assignee: Qisda Corporation, Gueishan Hsiang, Taoyuan County (TW)

( * ) Notice: Subject to any disclaimer, the term of this patent is extended or adjusted under 35 U.S.C. 154(b) by 774 days.

(21) Appl. No.: 10/711,546

(22) Filed: Sep. 24, 2004

(65) Prior Publication Data

US 2006/0072408 A1    Apr. 6, 2006

(51) Int. Cl.
*G11B 7/00* (2006.01)
(52) U.S. Cl. .................. 369/47.5; 369/47.53
(58) Field of Classification Search ............... 369/47.5, 369/47.53, 53.26
See application file for complete search history.

(56) References Cited

U.S. PATENT DOCUMENTS

| | | | | |
|---|---|---|---|---|
| 6,028,834 A | * | 2/2000 | Kuroda et al. | 369/47.53 |
| 6,052,347 A | * | 4/2000 | Miyata | 369/47.53 |
| 6,937,548 B2 | * | 8/2005 | Hsiao et al. | 369/47.53 |
| 7,257,064 B2 | * | 8/2007 | Lee | 369/47.53 |
| 7,289,403 B2 | * | 10/2007 | Lee | 369/47.53 |
| 2003/0107642 A1 | * | 6/2003 | Nagano | 347/246 |
| 2005/0163007 A1 | * | 7/2005 | Ueki | 369/47.53 |
| 2006/0077879 A1 | * | 4/2006 | Suh | 369/275.1 |

* cited by examiner

*Primary Examiner*—Thang V Tran
(74) *Attorney, Agent, or Firm*—Winston Hsu

(57) ABSTRACT

A method for writing a multi-session recordable disc. The method includes performing an immediate optimum power calibration (IOPC) in the lead-in area of each session of a multi-session recordable disc, determining a recording power for the session according to the IOPC output, and completing the session using the determined recording power. The method may be used in addition to the optimal power calibration (OPC) procedures included in the normal initialization of recordable discs. IOPC provides recording devices with an optimal recording power value obtained closer to the point of use than that obtained by conventional OPC procedures carried out at the extremities of the recordable area. Alternative embodiments of the method make accommodations for recording power variations according to disc velocity mode (CAV/CLV), recording speed, and the basis of the IOPC upon a variety of available data sources.

23 Claims, 5 Drawing Sheets

METHOD FOR IMPLEMENTING OPTIMAL RECORDING POWER FOR MULTI-SESSION RECORDABLE OPTICAL MEDIA IN AN OPTICAL DISC DRIVE

BACKGROUND OF INVENTION

1. Field of the Invention

The field of the invention is the writing of information to a recordable optical storage media in an optical disc drive, more particularly, the implementation of near-optimal recording power when writing to a multi-session recordable optical disc.

2. Description of the Prior Art

Optical discs are a versatile and cost-effective means of storing digital data and have been considered standard equipment on personal computers for several years. Broadly speaking, optical disc drives can be separated into two categories: read-only devices, which can only be used to read information already stored on an optical disc, and read-write devices. Devices in the latter category, as well as having the ability to read stored data from an optical disc, have the additional capability to record data. Some examples of read-only (read-only memory or ROM) optical disc drives are compact disc drives (CD-ROM), and digital versatile disc drives (DVD-ROM) in the prior art. An example of a device capable of writing to optical discs is a DVD+RW drive, this being a type of digital versatile disc—read-write/digital versatile disc—re-writable drive.

Optical discs store data as a continuous track of 'pits' (or 'marks') and 'lands' (or 'space') on a data-bearing surface that is rendered reflective by the application of a metallic layer during manufacture, the aforementioned 'lands' simply being parts of the track that are not pits. The continuous data track is formed on the optical disc in an Archimedean spiral, the start of the data area generally being toward the center of the disc and so in most cases data is read back from inner radii to outer radii. Pits/marks in ROM discs are molded into the data bearing surface when the discs are formed, whereas recordable and re-writable discs are produced as blanks, and have only a preformed groove or 'pre-groove' (together with a limited amount of embossed data in most cases) included during molding. Data is stored on re-writable optical discs using the same pit-land/mark-space principle, however the pit/mark features are added by 'burning' a special phase-change material layer applied to the disc substrate. In order to 'burn' or write to a re-writable disc, an optical pick-up head of an optical disc drive must be equipped with a 'write laser' in addition to a 'read laser', although these two items are generally a single laser being capable of operating at lower power output for read operations, and a range of higher power outputs for write operations.

The amount of power used to 'burn' pit/mark features into the bottom of the pre-groove, is crucial to the geometry of said features. The geometry of the pit/mark features in turn effects the read-back performance of read-back systems, hence prior to writing to a re-writable optical disc, a prior art optical disc drive will perform a write laser power calibration sweep known as optimum power calibration (OPC). Please refer to FIG. 1, which shows the general layout of a prior art single session recordable optical disc 10, featuring a lead-in area 11, an embossed area 12, a data area 13 and a lead-out area 14. The OPC generally comprises writing a test pattern to a designated portion of an optical disc positioned before the start of lead-in (the beginning of the user data area) referred to as the power calibration area (PCA). Alternatively, a PCA may be located after the end of lead-out (the end of the user data area).

Because there are two basic techniques applied to controlling the rotational speed of discs in optical disc drives, the recording power calibration value, obtained by the OPC process carried out in the PCA, may not be valid across the whole of the recording area. The two techniques used to control the rotational speed or disc velocity mode of optical discs are constant linear velocity (CLV) mode, and constant angular velocity (CAV) mode.

CLV mode is generally used for recording audio and video data, the speed of the pre-groove relative to the optical pick-up head (and therefore the read/write laser spot) being kept constant throughout the data area. This means that the disc is required to spin faster when the pick-up head radial position corresponds to the inner radii of the disc, i.e. toward the center of the disc, and slower when the pick-up head radial position corresponds to the outer radii of the disc. But because the pre-groove/laser spot speed relationship remains constant, the amount of laser power required to alter the reflectivity of the phase-change layer and so form marks in the pre-groove, also remains constant. That is, the amount of laser power required to produce a readable mark at radius 25 (25 mm from the absolute center of the disc) is the same as that required to produce a readable mark at radius 60. Were it not for other factors that effect recording power in CLV mode (some of which will be discussed later), an OPC implemented in the PCA should produce a recording power setting that can be applied at any point on the disc. In contrast, CAV mode applies a constant angular velocity to the disc, in other words the disc is spun at a fixed speed regardless of pick-up head position, and is more commonly used in computer data applications where rapid access times are an important factor.

A flow diagram outlining the prior art DVD+RW process including OPC, is shown in FIG. 2. The flow diagram 20 of FIG. 2 includes the following steps:

Step 1000: Start.

Step 1001: A decision is made regarding the write strategy to be used according to the considerations mentioned above, i.e. CLV is generally selected for concatenated data (hence the process will proceed to step 1002), audio and video for example, and CAV where random access is required within the session and perhaps the whole disc (hence the process will proceed to step 1004), as is generally the case for computer data applications.

Step 1002: In the case of CLV mode being selected, the optical disc drive pick-up head moves to the inner PCA located prior to (radius-wise) the lead-in area.

Step 1003: A Standard OPC is carried out at the inner PCA and the process proceeds to step 1009.

Step 1004: In the case of CAV mode being selected, the optical disc drive pick-up head moves to the inner PCA located prior to (radius-wise) the lead-in area.

Step 1005: A Standard OPC is carried out at the inner PCA.

Step 1006: The optical disc drive pick-up head moves to the outer PCA located after (radius-wise) the lead-in area.

Step 1007: A Standard OPC is carried out at the outer PCA.

Step 1008: Because a ramped recording power profile is required for recording, an interpolation technique is used to derive a suitable profile according to the OPC outputs, the selected recoding speed and (optionally) disc information such as phase-change material type.

Step 1009: The optical disc drive pick-up head moves to the lead-in start address of the new session.

Step 1010: The optical disc drive pick-up head write laser writes the session data to the disc, including (session) lead-in and (session) lead-out.

Step 1011: The session is closed.

Step 1012: End.

Because in CAV mode the disc is always rotating at the same speed, data stored at various different radii can be retrieved without long delays caused by the need to adjust and settle out the read-back speed. This in turn though, means that in CAV mode the relative velocity of the pre-groove and the read/write laser spot increases with radius, and with it the amount of laser power required to make a readable mark in the phase-change layer also increases. Hence, in CAV mode, an OPC implemented in a PCA, whether that PCA is located at the inner or outer radii of the recordable data area, will not be valid for all points on the disc. Hence commonly in the prior art, a power ramp profile is applied to the OPC derived recording power value to compensate for the abovementioned increase in relative velocity.

However, a simple linear ramp profile fitted to the increase in relative velocity is not adequate, because a number of factors introduce non-linearities to the speed/power relationship. For example, the type of phase-change material used and its application can vary from disc to disc and from manufacturer to manufacturer. Many discs do not have a linear response to increases in power, i.e. a doubling in the relative velocity between the pre-groove and the read/write laser spot may require more than double the amount of recording power. So, while a more accurate recording power ramp profile can be modeled using empirical data, the prior art method of carrying out OPC only in the PCA portion of a disc cannot optimize recording power for a particular disc. (Even when a power ramp is not required, as in CLV mode, the issue of disc manufacturing process variations local to the instant recording point will affect optimal recording power).

In addition, the abovementioned disc manufacturing process variations are typically introduced in circumstances where although process control may perhaps be within limits, it is not optimal. Because such variations are departures from the disc specification, it's unlikely that they will feature in the information encoded by the manufacturer in the disc pre-groove, hence end-user optical disc drives will receive no warning of their existence.

The problems relating to the recording of single session discs so far discussed, may also be encountered when recording a multi-session disc. When using, for example, an optical drive to record archive data onto a recordable disc, the entire capacity of the disc is not always filled during one recording session. Therefore, to maximize the utilization of recordable discs, multi-session strategies exist in the prior art to allow additional sessions to be appended after a first session, providing there is adequate disc space to accommodate the session(s) to be appended. Each appended session comprises a similar structure to that found in a single session, having autonomous lead-in, data and lead-out areas. Please refer to FIG. 3, which shows a general layout of a prior art multi-session recordable optical disc 30 featuring a first session, session 1 (31), comprising a lead-in area 32, a data area 33 and a lead-out area 34. A second session is appended, session 2 (35), comprising its own lead-in area 36, data area 37 and lead-out area 38.

It can be appreciated that the prior art methods discussed, being dependent upon data obtained by performing optimum power calibrations in power calibration areas located at the extremities of a recordable disc, carry drawbacks with respect to anticipating disc conditions in areas other than PCAs. Therefore they are unlikely to be able to maintain truly optimal recording power settings across the disc, whether writing single or multi-session recordable discs. There is a requirement then, to look beyond the prior art methods, for a method that can derive a recording power for an optical disc drive write laser, which is more closely optimized to the point of recording.

SUMMARY OF INVENTION

It is an objective of the present invention to provide a method for determining an immediate optimal power calibration (IOPC) when writing to a multi-session recordable disc.

According to the claimed invention, the method for writing a multi-session recordable disc, includes moving an optical pick-up head of an optical disc drive to start of a lead-in area of a session of the multi-session recordable disc, performing an OPC in the lead-in area of the session of the multi-session recordable disc to generate an OPC output, determining a recording power according to the OPC output, and completing the session according to the determined recording power.

These and other objectives of the present invention will no doubt become obvious to those of ordinary skill in the art after reading the following detailed description of the preferred embodiment that is illustrated in the various figures and drawings.

DETAILED DESCRIPTION

As discussed in the description of the prior art above, there is a requirement for a method that can derive a recording power for an optical disc drive write laser, which is more closely optimized to the point of recording. The present invention method is directed toward providing accurate write strategy settings for multi-session recordings, and takes advantage of additional opportunities arising to perform optimum power calibration (OPC) operations during such recordings. That is, the present invention provides an "Immediate OPC" (IOPC).

The IOPC procedure involves the performance of a standard OPC, during which test words are written using a range of recording powers on and spread to both sides of a nominal power value, this value often being derived from recommended power settings encoded by the optical disc manufacturer in the abovementioned pre-groove. The test words are then read back at a normal read power in order to ascertain which recording power setting yielded the most favorable results in terms of such parameters as beta ($\beta$), which is effectively a measure of mark/space asymmetry. However, instead of performing the OPC in an allocated power calibration area (PCA), IOPC utilizes a buffer zone located in the lead-in area of each session. Since the IOPC is executed at a location of the disc immediately adjacent to the intended recording area, the data obtained through IOPC, i.e. a recording power corresponding to optimum values for key read-back parameters, the method can thus provide optimal settings for the write strategy to be applied to that session. Most importantly, because the buffer zone function is redundant in most general applications, the present invention IOPC method can carry out the above function while remaining strictly compliant to industry standards.

Figure 1:
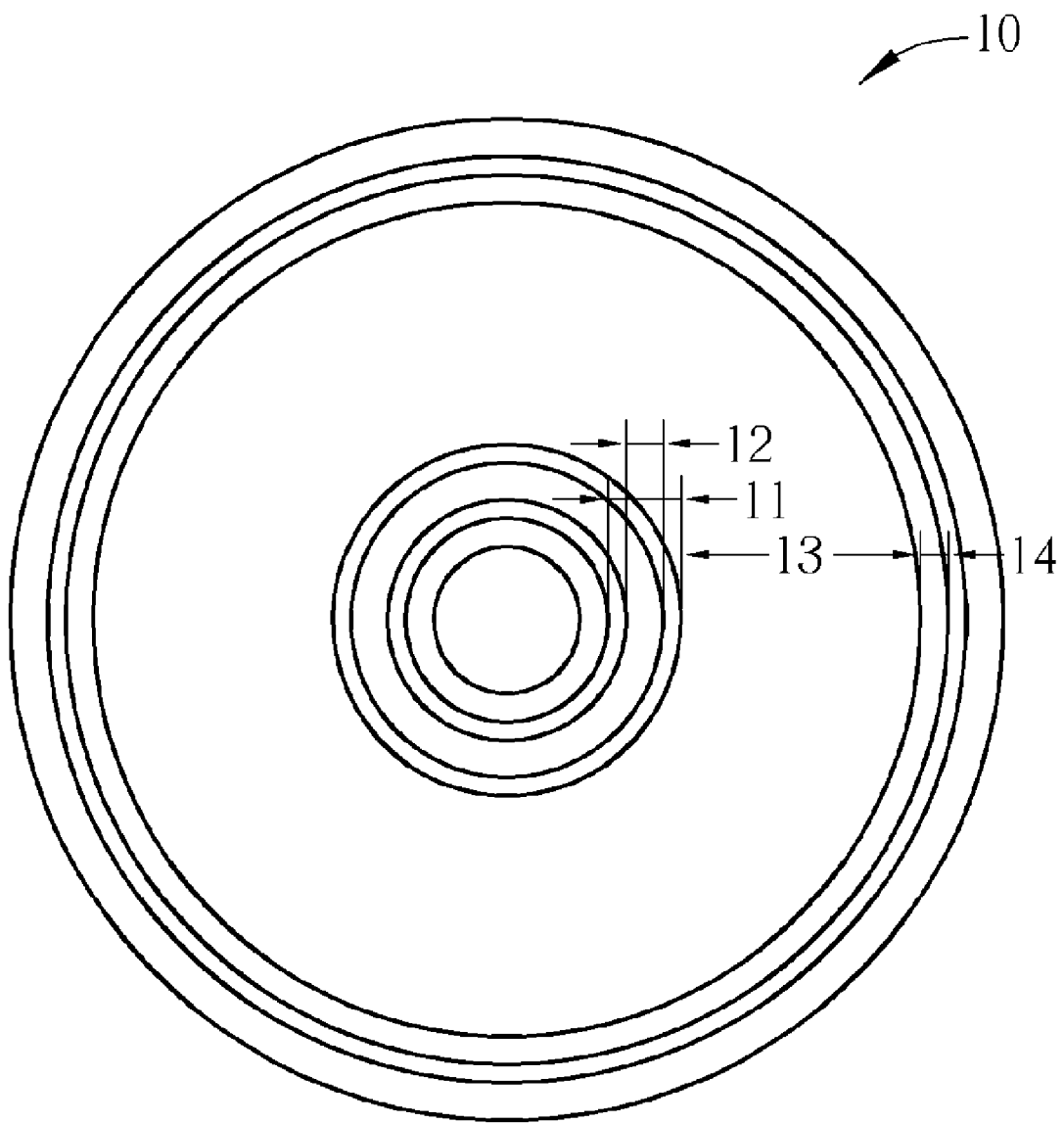
FIG. 1 shows a general layout of a prior art single session recordable optical disc.
Figure 2:
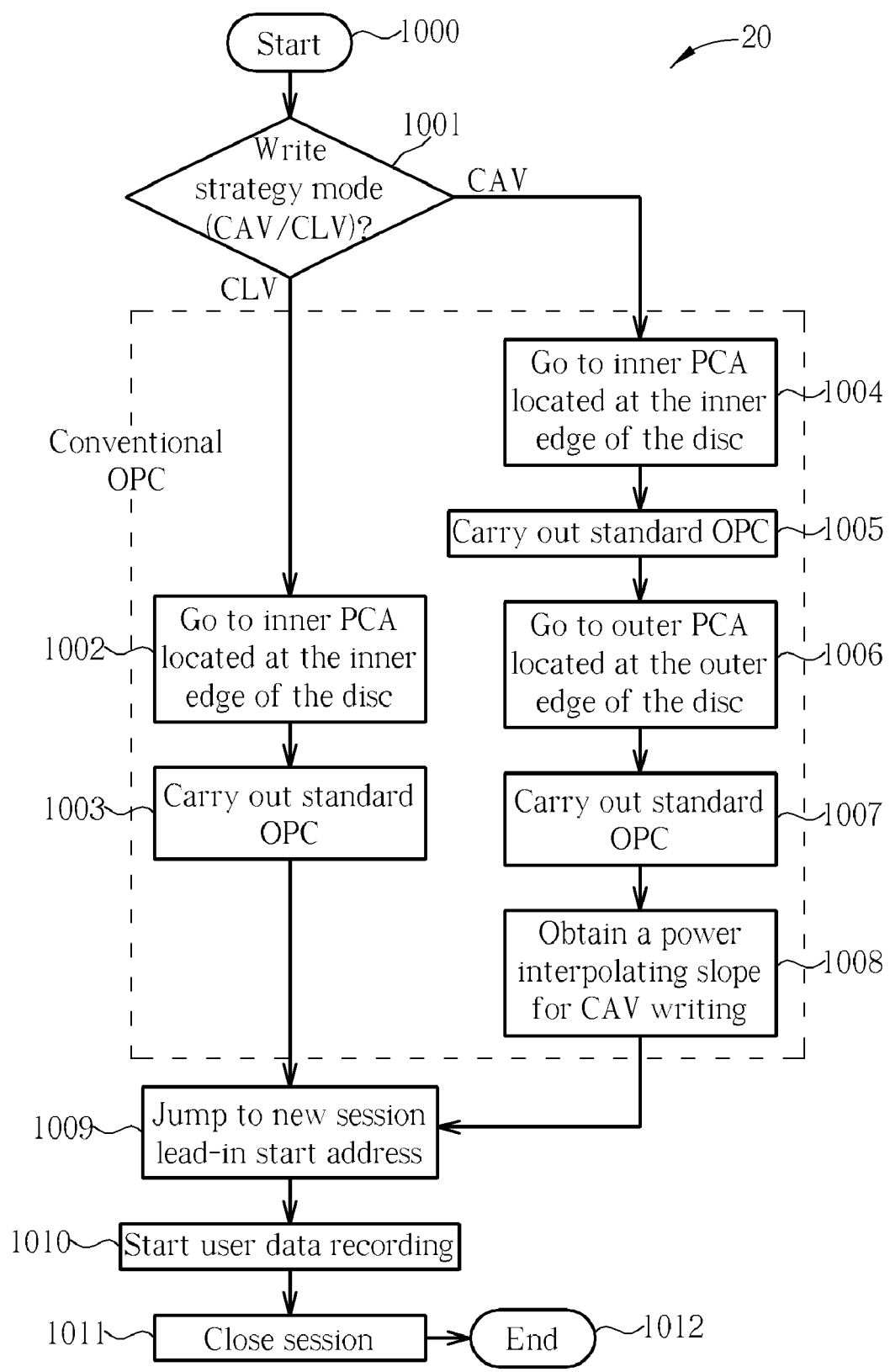
FIG. 2 shows a flow diagram of a prior art OPC process.
Figure 3:
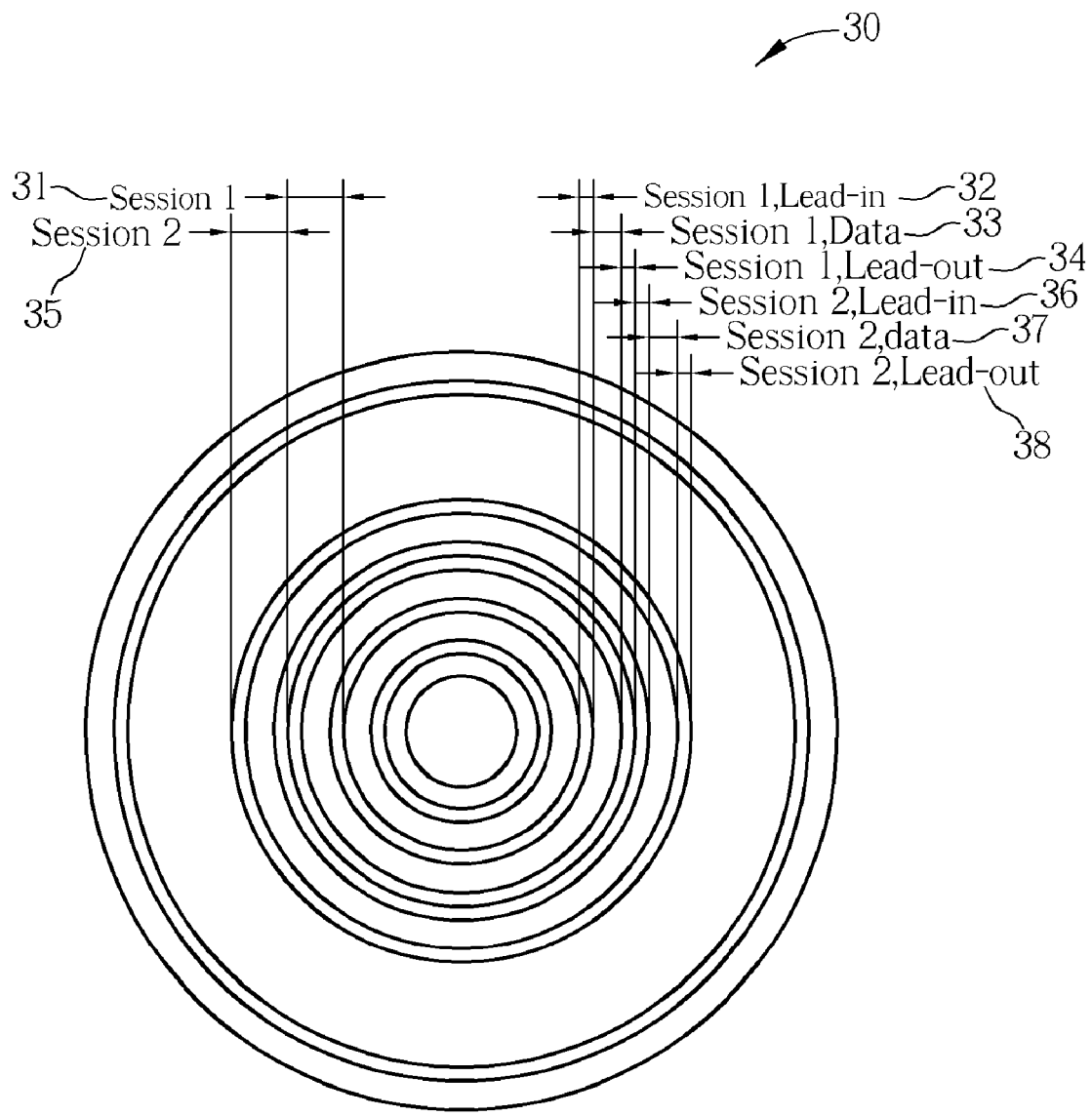
FIG. 3 shows a general layout of a prior art multi-session recordable optical disc.
Figure 4:
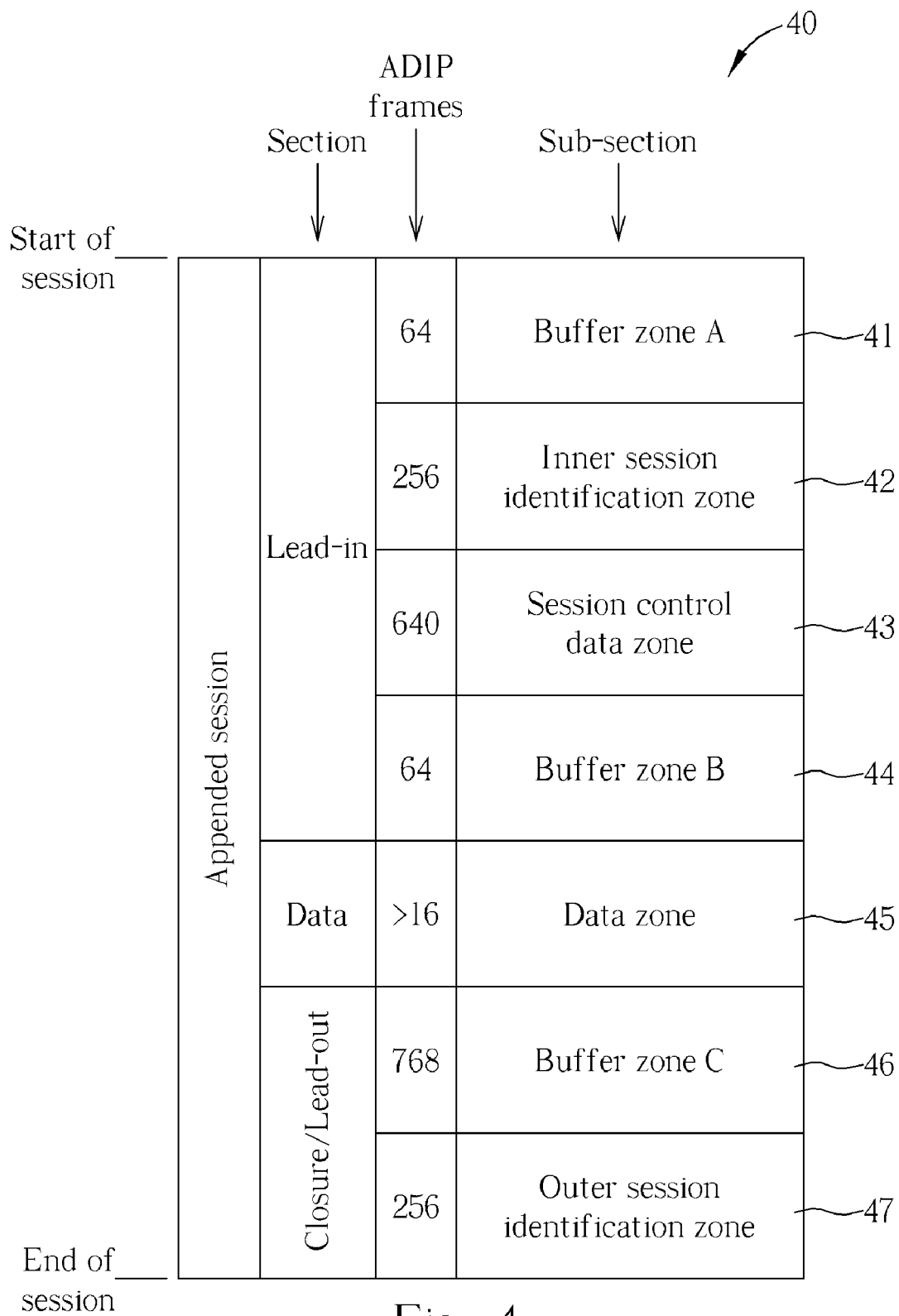
FIG. 4 shows a general layout of a single appended session of a multi-session disc.

This methodology differs from the current OPC specified in the DVD+R/RW specifications which, as mentioned above, prescribe that the OPC is executed in a power calibration area (PCA) located at either an innermost or outermost area (or both) of a disc. Instead of, or alternatively, in addition to the prior art OPC, the IOPC is performed in a buffer zone forming part of the lead-in portion of each session appended to the multi-session disc. Here, the term 'appended session' means any session added to the multi-session disc after the first session. A first session may be recorded with or without IOPC, as it will be positioned close to the innermost PCA, thereby reducing the benefits of performing an IOPC. Please refer to FIG. 4, which shows a general layout of a single appended session 40 of a multi-session disc 30. The two buffer zones featured (buffer zone A 41 and buffer zone B 44), being 64 'address in pre-groove' (ADIP) frames long in the case of DVD+R/RW media, each provide adequate space to accommodate a standard optimum power calibration (OPC) procedure. In a basic embodiment of the present invention, only buffer zone A 41 is utilized. As mentioned above, the buffer zones are redundant under normal operating conditions currently set forth in the specifications for DVD recordable discs, the frame bits of all 64 frames being set to logic '0' as a default setting. Following the completion of a standard OPC in either buffer zone, any unused ADIP frame bits are set to logic '0'.

(As both the prior art OPC described above and the IOPC include a 'standard' OPC procedure, this being any suitable procedure involving the burning and evaluation of test words/data on the disc for the purpose of identifying an optimal recording power value, the term conventional OPC (COPC) is used hereinafter to refer to OPCs carried out in prior art PCAs.)

Figure 5:
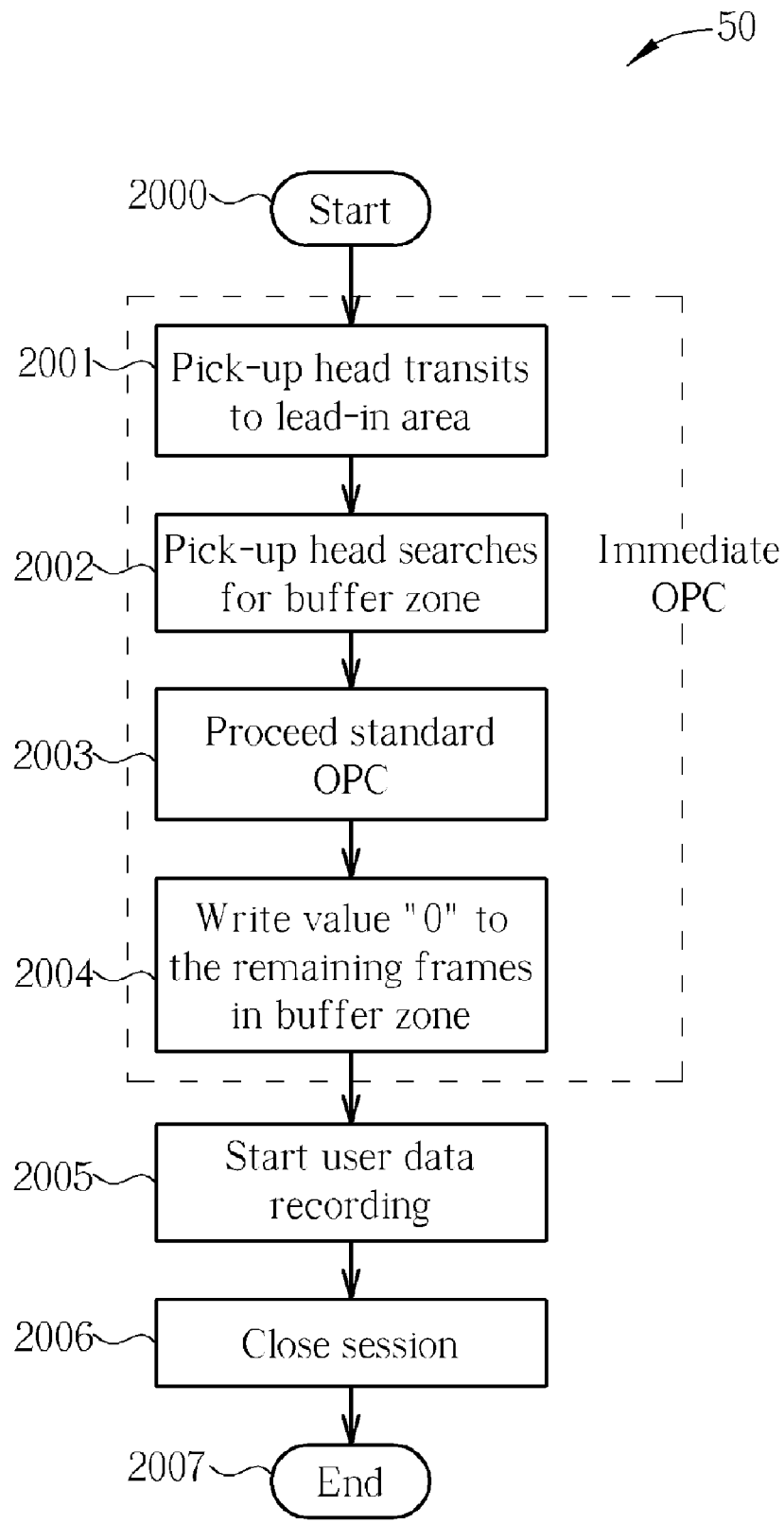
FIG. 5 shows a flow diagram of the present invention IOPC process.

A basic embodiment of the present invention describes an IOPC independent of any COPC, disc velocity mode or interpolation technique. FIG. 5 shows a flow chart 50 for such an embodiment, and includes the following steps:

Step 2000: Start.

Step 2001: The optical disc drive pick-up head transits to the allocated lead-in area of the session to be appended.

Step 2002: The optical disc drive pick-up head searches for the buffer zone in the lead-in area.

Step 2003: A standard OPC procedure is carried out in the buffer zone.

Step 2004: The logic value '0' is written to any remaining frame bits in the buffer zone.

Step 2005: User data is written to disc in current session data area using a recording power identified by step 2003.

Step 2006: The session is closed in accordance with relevant standards.

Step 2007: End.

The above embodiment of the present invention method is of greatest advantage when assuming a small size for each session, as the IOPC would give a more accurate recording power value in terms of the local conditions in the area of the disc to which the session is written. However, due to factors mentioned above, as session size increases, particularly in CAV mode, further correction of the recording power during the session becomes more beneficial. For this reason, an alternative embodiment having an additional step wherein an interpolation technique is introduced to determine a recording power profile, which in the case of a CAV mode write strategy would vary recording power according to the recording power profile as the radius (at which the pick-up head writes) increases. (Although a nominally flat recording power profile is required for a CLV mode write strategy, i.e. fixed power, the present invention method is still applicable, as optimum recording power values across the disc data area will still vary according to the mechanical parameters discussed above).

The data upon which interpolation is based may be derived from a variety of sources. Look-up tables (predetermined profile data) accessible by the optical disc drive may provide default nominal recording power values upon which to base the IOPC, and also data with which to interpolate recording power profiles according to the IOPC output, the values being modified according to, for example, disc type and recoding speed data. Alternatively, the recording power data encoded on the recordable disc by the disc manufacturer, and generally read by the optical disc drive when initializing a disc, may be used to the same ends. In a further alternative embodiment the results of a conventional OPC (COPC), having been performed in a PCA as described by relevant specifications, also any previous IOPC procedures may be used as a basis for either the setting of a nominal power for the IOPC, or interpolating a recording power profile, or both. The COPC, like the IOPC, may be based upon a nominal recording power value and have results interpolated to form a recording power profile according to (but not limited to) one of the following:

Data obtained from a look-up table accessible by the optical disc drive.

Recording power data encoded on the disc.

The IOPC may be based upon a nominal recording power value and have results interpolated to form a recording power profile according to either of the above, or additionally (but not limited to) one of the following:

Data determined by a COPC process.

Data determined by a previous IOPC process.

Stored historical data where the same drive has been used to record a previously appended session.

The method of the present invention can be applied at any recording speed that the optical disc drive is capable of. (Recording speeds are usually quoted as multiples of a base playback velocity set forth in the relevant specification, the base velocity often referred to as '1×' and commonplace multiples being '4×', '8×' etc.). Indeed, it is of particular benefit to have the more critically optimized settings offered by the present invention at higher recording velocities, as the affects of deleterious non-optimized parameters are duly compounded.

Compared with the COPC, the present invention IOPC method will execute an OPC procedure according to the selected writing speed, exactly at the location that the new session starts. Thus it can obtain optimum recording/writing power and write strategy settings specifically relevant to the portion of the disc allocated for the session. It also provides the option of performing the above tasks without referring to the COPC results from either the inner or outer PCAs of a disc, nor using interpolation to predict a suitable recording power profile. However, COPC data may be used as a basis for deriving a recording power profile for a session, in which case the COPC derived profile may be scaled i.e. multiplied, by a factor or series of factors in accordance with the results of the relevant IOPC process, in order to render the COPC profile compatible with the IOPC and session disc rotational speed, and hence recording power range. IOPC provides better writing quality in terms of key disc read-back parameters including jitter, mark/space asymmetry and block error rate, while maintaining data integrity that is fully compatible with existing CD and DVD drives found on the consumer market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for writing a multi-session recordable disc, comprising the following steps:
   (a) moving an optical pick-up head of an optical disc drive to a lead-in area of a session of the multi-session recordable disc;
   (b) performing an optimal power calibration (OPC) in the lead-in area of the session of the multi-session recordable disc to generate an OPC output;
   (c) determining a recording power according to the OPC output;
   (d) writing data on the session according to the determined recording power; and
   (e) checking if a session of the multi-session recordable disc to be written is a first session of the multi-session recordable disc, wherein steps (a)-(d) are performed if the session in step (e) is a session other than the first session of the multi-session recordable disc.

2. The method of claim 1 further comprising the following steps:
   (f) determining a recording power according to an optimal power calibration (OPC) output of an OPC carried out in a power calibration area (PCA); and
   (g) if the session in step (e) is the first session of the multi-session recordable disc, writing data on the session of the multi-session recordable disc in step (e) according to the recording power determined in step (f).

3. The method of claim 1 further comprising determining a local recording power profile according to the OPC output and predetermined profile data.

4. The method of claim 3 wherein determining a local recording power profile according to the OPC output and predetermined profile data comprises determining a local recording power profile by interpolating the predetermined profile data according to the OPC output.

5. The method of claim 3 wherein step (d) comprises writing data on the session according to the determined local recording power profile.

6. The method of claim 1 further comprising determining a local recording power profile according to the OPC output and recording power data encoded on the recordable disc.

7. The method of claim 6 wherein determining a local recording power profile according to the OPC output and recording power data encoded on the recordable disc comprises determining a local recording power profile by interpolating the recording power data encoded on the recordable disc according to the OPC output.

8. The method of claim 6 wherein step (d) comprises writing data on the session according to the determined local recording power profile.

9. The method of claim 1 further comprising deriving a nominal recording power value upon which to base the OPC from predetermined profile data.

10. The method of claim 1 further comprising deriving a nominal recording power value upon which to base the OPC from a recording power data encoded on the recordable disc.

11. The method of claim 1 further comprising deriving a nominal recording power value upon which to base the OPC from a previous OPC procedure.

12. The method of claim 11 wherein the previous OPC procedure is an OPC carried out in a lead-in area of a previous session.

13. The method of claim 1, wherein rotation of the recordable disc is at a velocity selected from a range of predetermined velocities being multiples of a base recording velocity and each multiple being equal to or greater than 1.

14. The method of claim 1 wherein step (b) comprises performing the OPC in a buffer zone of the lead-in area of the session.

15. A method for writing a multi-session recordable disc, comprising the following steps:
   (a) moving an optical pick-up head of an optical disc drive to a lead-in area of a session of the multi-session recordable disc;
   (b) performing an optimal power calibration (OPC) in the lead-in area of the session of the multi-session recordable disc to generate an OPC output that includes performing the OPC in a buffer zone of the lead-in area of the session and setting unused frame bits of the buffer zone to a logic zero state;
   (c) determining a recording power according to the OPC output; and
   (d) writing data on the session according to the determined recording power.

16. The method of claim 1, further comprising the following step:
   (h) reading recording power data encoded on the recordable disc.

17. A method for writing a multi-session recordable disc, comprising the following steps:
   (a) moving an optical pick-up head of an optical disc drive to a lead-in area of a session of the multi-session recordable disc;
   (b) performing an optimal power calibration (OPC) in the lead-in area of the session of the multi-session recordable disc to generate an OPC output;
   (c) determining a recording power according to the OPC output;
   (d) writing data on the session according to the determined recording power;
   (j) performing an optimum power calibration (OPC) in a power calibration area (PCA) to generate an OPC output; and
   (k) determining a disc-wide recording power profile by interpolation of predetermined profile data according to the OPC output of step (j).

18. The method of claim 17 further comprising deriving a nominal recording power value upon which to base the optimum power calibration (OPC) of step (j) from recording power data.

19. The method of claim 17 further comprising deriving a nominal recording power value upon which to base the optimum power calibration (OPC) of step (j) from predetermined profile data.

20. The method of claim 17 further comprising determining a local recording power profile according to the OPC output of the OPC of step (b) and the disc-wide recording power profile.

21. The method of claim 20 wherein determining a local recording power profile according to the OPC output of the OPC of step (b) and the disc-wide recording power profile comprises determining a local recording power profile by interpolating the OPC output of the OPC of step (b) according to the disc-wide recording power profile.

22. The method of claim 20 wherein step (d) comprises writing data on the session according to the determined local recording power profile.

23. The method of claim 17 further comprising scaling the disc-wide recording power profile of step (k) according to the OPC output of the OPC of step (b).

* * * * *